US006189716B1

(12) United States Patent
Lawrukovich et al.

(10) Patent No.: US 6,189,716 B1
(45) Date of Patent: Feb. 20, 2001

(54) SECONDARY SEALING OF A FUEL TANK

(75) Inventors: Michael Paul Lawrukovich, Flushing; David Howard Burke, Flint; Mahlon Richard Pachciarz, Grand Blanc; Edward A. Beutler, Flushing, all of MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/465,205

(22) Filed: Dec. 15, 1999

(51) Int. Cl.[7] ..................................................... B65D 88/12
(52) U.S. Cl. .......................... 220/4.14; 220/562; 220/378
(58) Field of Search ................................. 220/4.14, 4.12, 220/562, 563, 564, 327, 378

(56) References Cited

U.S. PATENT DOCUMENTS

| | | | | |
|---|---|---|---|---|
| 3,915,337 | * | 10/1975 | Parsels | 220/327 |
| 4,465,201 | * | 8/1984 | Chalfant, Jr. | 220/582 |
| 4,747,601 | * | 5/1988 | Glachet | 277/12 |
| 4,858,778 | * | 8/1989 | Patrick | 220/562 |
| 4,917,246 | * | 4/1990 | Edelhoff | 206/511 |
| 5,071,140 | * | 12/1991 | Rio | 277/27 |
| 5,560,511 | * | 10/1996 | McNerney | 220/327 |
| 5,582,799 | * | 12/1996 | Amorese et al. | 422/118 |

* cited by examiner

Primary Examiner—Stephen Castellano
(74) Attorney, Agent, or Firm—Vincent A. Cichosz

(57) ABSTRACT

A seal assembly for a fuel tank having a tank opening therein includes an access cover adapted to close the tank opening. The seal assembly also includes a first seal made of a compressible material adapted to be disposed between the access cover and a tank surface of the fuel tank. The seal assembly includes a second seal made of a non-permeating material adapted to be disposed between the access cover and the tank surface. The seal assembly further includes an attachment plate for attachment to the tank surface and adapted to be disposed about the tank opening. The seal assembly includes at least one attachment fastener cooperating with the attachment plate to secure the access cover to the attachment plate and to seal the tank opening via the first seal and the second seal.

19 Claims, 1 Drawing Sheet

SECONDARY SEALING OF A FUEL TANK

TECHNICAL FIELD

The present invention relates generally to fuel tanks for vehicles and, more particularly, to a seal assembly for a fuel tank of a vehicle.

BACKGROUND OF THE INVENTION

It is known to provide a fuel tank such as a metal fuel tank in a vehicle to hold fuel to be used by an engine of the vehicle. Typically, the fuel tank has a tank opening and a unit installed into the tank via the tank opening. An access cover is placed over the tank opening and is used to assemble and service the fuel pump and other related components. The access cover must be sealed to prevent fuel leakage and evaporative emissions. In most vehicles, the access cover is sealed with an elastomer or metal gasket, not a combination of both the elastomer and metal. An elastomer gasket is typically used to seal metal or plastic surfaces to address assembly tolerances, temperature fluctuations and pressure fluctuations encountered in normal use or extreme conditions such as a vehicle impact. The typical sealing method involves compression of the elastomeric gasket made of an elastomer such as nitrile or viton rubber. However, these materials may not be acceptable to meet zero evaporative emissions. A metal gasket has been used in production for tubing connections, for example inverted flare or compression fittings, and cylinder head gaskets.

It is desirable to provide a seal assembly for a fuel tank in a vehicle that has zero evaporative emission. It is also desirable to provide a seal assembly for a fuel tank in a vehicle that maintains sealing for assembly tolerances, temperature and pressure variation. It is further desirable to provide a seal assembly for a fuel tank in a vehicle that can be taken apart and re-sealed.

SUMMARY OF THE INVENTION

It is, therefore, one object of the present invention to provide a new seal assembly for a fuel tank in a vehicle.

It is another object of the present invention to provide a seal assembly for a fuel tank in a vehicle that provides durable seal of an elastomer and zero permeation of a metal.

To achieve the foregoing objects, the present invention is a seal assembly for a fuel tank having a tank opening therein including an access cover adapted to close the tank opening. The seal assembly also includes a first seal made of a compressible material adapted to be disposed between the access cover and a tank surface of the fuel tank. The seal assembly includes a second seal made of a non-permeating material adapted to be disposed between the access cover and the tank surface. The seal assembly further includes an attachment plate for attachment to the tank surface and adapted to be disposed about the tank opening. The seal assembly includes at least one of attachment fastener cooperating with the attachment plate to secure the access cover to the attachment plate and to seal the tank opening via the first seal and the second seal.

One advantage of the present invention is that a new seal assembly is provided for a fuel tank in a vehicle. Another advantage of the present invention is that the seal assembly provides the combination of an elastomeric seal and a metallic seal that is a durable seal with zero permeation that can be taken apart and re-sealed using new seals when necessary. Yet another advantage of the present invention is that the seal assembly improves emission performance to meet new emission requirements. Still another advantage of the present invention is that the seal assembly has redundant sealing, which improves quality as assemblies will experience fewer leakage from assembly. A further advantage of the present invention is that the seal assembly improves first time quality, scrap reduction and assembly rework because of the redundant sealing. Yet a further advantage of the present invention is that the seal assembly is that new seals will be re placed t o maintain sealing after service removal. Still a further advantage of the present invention is that the sealing assembly uses an elastomeric seal to provide durable sealing for assembly tolerancing, temperature and pressure variation and a metallic seal to provide a barrier for permeation to allow zero or very low fuel evaporative emission.

other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
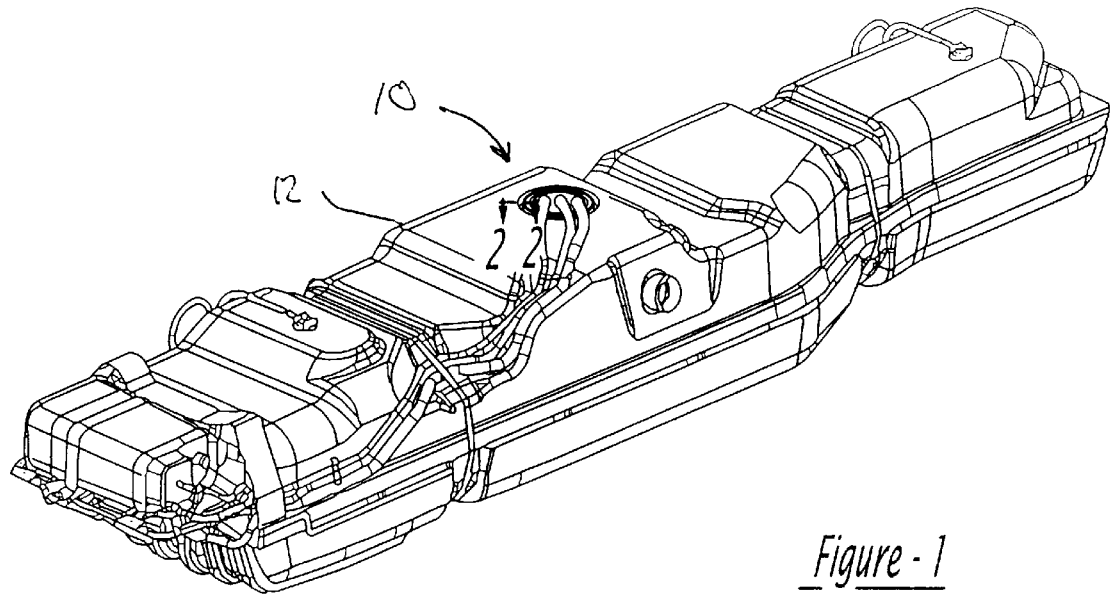
FIG. 1 is a perspective view of a seal assembly, according to the present invention, illustrated in operational relationship with a fuel tank of a vehicle.
Figure 2:
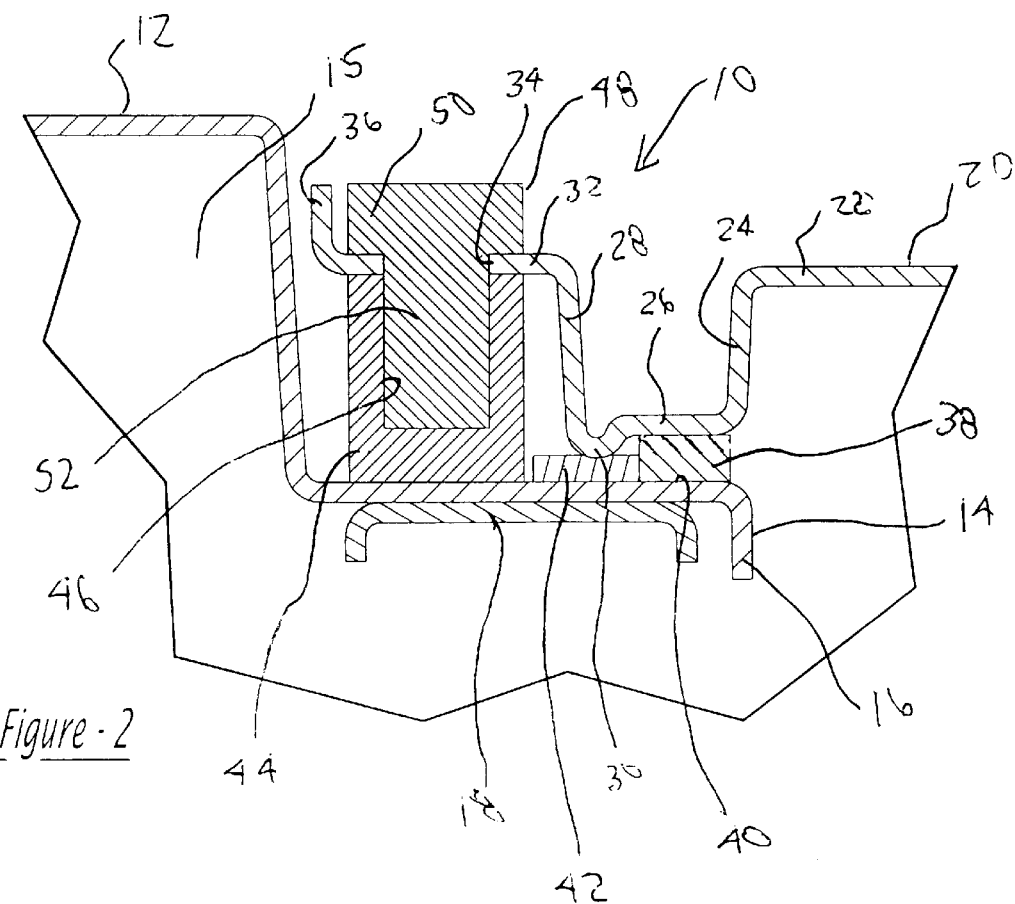
FIG. 2 is an enlarged fragmentary elevational view of the seal assembly of FIG. 1.

Referring to the drawings and in particular FIGS. 1 and 2, one embodiment of a seal assembly 10, according to the present invention, is shown for a fuel tank 12 in a vehicle (not shown). The fuel tank 12 includes a tank opening 14 to communicate with an interior 15 containing fuel therein. The tank opening 14 is generally circular in shape, but may have any suitable shape. The fuel tank 12 may include a flange 16 extending downwardly into the interior 15 adjacent the tank opening 14 to resist bending during seal compression and usage pressures. The fuel tank 12 may include an opening support 18 disposed in the interior 15 adjacent the opening 14. The opening support 18 is an annular ring for additional support to resist bending during seal compression and usage pressure. The opening support 18 is made of rigid material such as metal. The fuel tank 12 also includes a component (not shown) disposed inside the fuel tank 12. The component may be any type normally associated with a fuel tank such as a fuel pump. The seal assembly 10 is used to create a seal between the component and the fuel tank 12. The fuel tank 12 is generally made of a metallic material and formed by a stamping press. It should be appreciated that, except for the seal assembly 10, the fuel tank 12 is conventional and known in the art.

The seal assembly 10 includes an access cover 20 to seal and close the tank opening 14. The access cover 20 is made of a metallic material such as steel. The access cover 20 is generally circular in shape, but may have any suitable shape. The access cover 20 has a generally planar base wall 22 and a side wall 24 extending downwardly and generally perpendicular to the base wall 22. The access cover 20 also has a base flange 26 extending outwardly and generally perpendicular to the side wall 24. The access cover 20 has a side flange 28 extending upwardly and generally perpendicular to the base flange 26 and a compression flange 30 extending downwardly and interconnecting the base flange 26 and side flange 28. The compression flange 30 has a general U shape to provide rigidity that allows metallic seal compression and springback to provide seal compression during thermal expansion. The access cover 20 has a locking flange 32 extending generally perpendicular to the side flange 28. The locking flange 32 has a plurality of apertures 34 extending therethrough and spaced circumferentially thereabout for a function to be described. The access cover 20 may include an outer flange 36 extending upward or downward and generally perpendicular to the locking flange 32 for strength. The access cover 20 is a monolithic structure being integral, unitary and one-piece. It should be appreciated that the walls 22,24 and flanges 26,28,30,32,36 are annular.

The seal assembly 10 also includes a first seal 38 such as a gasket disposed between the base flange 26 and a tank surface or top 40 of the fuel tank 12. The first seal 38 is generally circular in shape and is made of a flexible or compressible material such as an elastomeric material. It should be appreciated that the first seal 38 provides durable fluid sealing for assembly tolerancing, temperature and pressure variation. It should also be appreciated that the first seal 38 is conventional and known in the art.

The seal assembly 10 includes a second seal 42 such as a gasket disposed between the compression flange 30 and the tank surface 40 of the fuel tank 12. The second seal 42 is generally circular in shape and is made of a rigid material such as a metal or a non-permeating plastic material such as Teflon. The second seal 42 has a thickness less than a thickness of the first seal 38. it should be appreciated that the second seal 42 provides sealing for evaporative fuel emissions.

The seal assembly 10 also includes an attachment plate 44 disposed about the tank opening 14 for attachment to the tank surface 40. The attachment plate 44 is disposed between the locking flange 32 and the tank surface 40 of the fuel tank 12 and spaced radially from the second seal 42. The attachment plate 44 is generally circular in shape and has a generally rectangular cross-sectional shape. The attachment plate 44 includes a plurality of apertures 46 extending therethrough and spaced circumferentially thereabout. The apertures 46 are preferably threaded. The attachment plate 44 is made of a rigid material such as metal or plastic. It should be appreciated that the attachment plate 44 is welded to the tank surface 40 to avoid additional sealing locations by having attachment fasteners 48 to be described extending through the fuel tank 12. It should also be appreciated that the tank surface 40 is extended beyond the attachment plate 44, putting that surface beyond the weld and allowing the seal 42 to be sealed directly to the tank surface 40. It should further be appreciated that the attachment plate 44 provides securing for the attachment fasteners 48 to be described and loading through the access cover 20 to compress the seals 38 and 42.

The seal assembly 10 further includes a plurality of attachment fasteners 48 extending into the apertures 46 of the attachment plate 44. The attachment fasteners 48 are generally cylindrical in shape and have a generally circular cross-sectional shape. The attachment fasteners 48 have a generally annular head 50 extending radially outwardly at one end thereof and disposed adjacent the locking flange 32. The attachment fasteners 48 also have a shaft 52 extending axially from the head 50 and being threaded for threaded engagement with the threaded apertures 46 of the attachment plate 44. The attachment fasteners 48 are secured through the access cover 20 to the attachment plate 44 and compress the seals 38 and 42. The attachment fasteners 48 are made of a metal material. It should be appreciated that the attachment plate 44 and attachment fasteners 48 are conventional and known in the art.

In operation, the seal assembly 10 is illustrated in an assembled state in FIG. 2. Once the attachment plate 44 is formed and welded to the tank surface 40, the first seal 38 is disposed about the tank opening 14 and the second seal 42 disposed about the first seal 38 and the tank opening 14. The access cover 20 is disposed over the tank opening 14 and adjacent the attachment plate 44. The attachment fasteners 48 are extended through the apertures 34 in the access cover 20 and threadably engaged with the apertures 46 in the attachment plate 44 to compress the base flange 26 against the first seal 38 and the first seal 38 against the tank surface 40. Simultaneously, the compression flange 30 engages and compresses against the second seal 42 and the second seal 42 against the tank surface 40. It should be appreciated that the first seal 38 provides for general sealing and the second seal 42 provides for hydrocarbon sealing for evaporative emissions.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel tank assembly for a vehicle comprising:
   a fuel tank having a tank opening and a tank surface surrounding said tank opening;
   an access cover adapted to close the tank opening;
   a first seal made of a compressible material adapted to be disposed between said access cover and a tank surface of the fuel tank;
   a second seal made of a non-permeating material adapted to be disposed between said access cover and the tank surface;
   an attachment plate for attachment to the tank surface and adapted to be disposed about the tank opening; and
   at least one attachment fastener cooperating with said attachment plate to secure said access cover to said attachment plate and to seal the tank opening via said first seal and said second seal.

2. A fuel tank assembly as set forth in claim 1 wherein said compressible material is an elastomeric material.

3. A fuel tank assembly as set forth in claim 1 wherein said non-permeating material is either one of a metal and plastic material.

4. A fuel tank assembly as set forth in claim 1 wherein access cover has at least one first aperture extending therethrough and said attachment plate has at least one second aperture extending therein and aligned with said at least one first aperture.

5. A fuel tank assembly as set forth in claim 4 wherein said at least one attachment fastener has a head extending radially and disposed adjacent said access cover and a shaft extending axially therefrom, said shaft extending through said at least one first aperture and into said at least one second aperture.

6. A fuel tank assembly as set forth in claim 3 wherein said access cover has a compression flange extending outwardly to engage said second seal.

7. A fuel tank assembly as set forth in claim 3 wherein said access cover comprises a generally planar base wall, a side wall extending generally perpendicular to said base wall and a base flange extending outwardly generally perpendicular to said side wall, said base flange engaging said first seal.

8. A fuel tank assembly as set forth in claim 3 wherein said access cover is made of a metal material.

9. A fuel tank assembly as set forth in claim 1 wherein said attachment plate is made of a metal material.

10. A fuel tank assembly as set forth in claim 1 including a weld for securing said attachment plate to the tank surface.

11. A fuel tank assembly as set forth in claim 1 including a support member adapted to be disposed inside the fuel tank adjacent the tank opening and secured thereto.

12. A fuel tank assembly for a vehicle comprising:
   a fuel tank having a tank opening and a tank surface surrounding said tank opening;
   an access cover adapted to close the tank opening;
   a first seal made of an elastomeric material adapted to be disposed between said access cover and a tank surface of the fuel tank;
   a second seal made of a non-penneating material adapted to be disposed between said access cover and the tank surface;
   an attachment plate for attachment to the tank surface and adapted to be disposed about the tank opening; and
   a plurality of attachment fasteners cooperating with said attachment plate to secure said access cover to said attachment plate and to seal the tank opening via said first seal and said second seal.

13. A fuel tank assembly as set forth in claim 12 wherein said non-permeating material is either one of a metal and plastic material.

14. A fuel tank assembly as set forth in claim 12 wherein access cover has a plurality of first apertures extending therethrough and said attachment plate has a plurality of second apertures extending therein and aligned with said first aperture.

15. A fuel tank assembly as set forth in claim 14 wherein each of said attachment fasteners has a head extending radially and disposed adjacent said access cover and a shaft extending axially therefrom, said shaft extending through said first apertures and into said second apertures.

16. A fuel tank assembly as set forth in claim 15 wherein said access cover comprises a generally planar base wall, a side wall extending generally perpendicular to said base wall and a base flange extending outwardly generally perpendicular to said side wall, said base flange engaging said first seal.

17. A fuel tank assembly as set forth in claim 16 wherein said access cover has a compression flange extending outwardly from said base flange to engage said second seal.

18. A fuel tank assembly as set forth in claim 17 wherein said access cover has a side flange extending from said compression flange and generally perpendicular to said base flange and a locking flange extending generally perpendicular to said side flange, said first apertures extending through said locking flange.

19. A fuel tank assembly as set forth in claim 13 wherein said access cover is made of a metal material.

* * * * *